Jan. 30, 1962 L. W. WELCH ETAL 3,018,711
DUCT STRUCTURE
Filed April 7, 1958 2 Sheets-Sheet 1

INVENTORS
LEWIS W. WELCH
ALFRED F. MILLINGTON
BY
Whittemore, Hulbert &
Belknap
ATTORNEYS Jan. 30, 1962 L. W. WELCH ETAL 3,018,711
DUCT STRUCTURE
Filed April 7, 1958 2 Sheets-Sheet 2

INVENTORS
LEWIS W. WELCH
BY ALFRED F. MILLINGTON

ATTORNEYS

United States Patent Office 3,018,711
Patented Jan. 30, 1962

3,018,711
DUCT STRUCTURE
Lewis Wellington Welch, Detroit, and Alfred F. Millington, Northville, Mich., assignors to Novi Equipment Company, Novi, Mich., a corporation of Michigan
Filed Apr. 7, 1958, Ser. No. 726,737
7 Claims. (Cl. 98—2)

The present invention relates to duct structure and more particularly, to an air inlet and outlet construction including an adjustable nozzle for directing air particularly useful in conjunction with an air conditioning system for cooling an automotive vehicle.

It is an object of the present invention to provide in a cooling system of the character described, a mounting flange adapted to be used at the intake or discharge end of an air duct including means for selectively associating therewith an adjustable air directing discharge nozzle, and a protective grille.

More specifically, it is an object of the present invention to provide in combination a mounting flange having a circular opening provided with an annular radially inwardly extending bead, and an adjustable nozzle including at one end thereof a plurality of slightly flexible fingers provided at the outer surface thereof with aligned grooves adapted to receive the bead.

It is a further object of the present invention to provide structure as described in the preceding paragraph in which the mounting flange includes an inwardly extending abutment dimensioned to be received in the space between adjacent fingers of the air directing nozzle to serve the dual purpose of releasably retaining the nozzle in angularly adjusted position and to provide an audible click device operable as the nozzle is adjusted angularly.

It is a further object of the present invention to provide in combination a mounting flange having a cylindrical opening in combination with a dished grille formed of resilient material including generally radially outwardly extending but slightly inclined sharp projections yieldable inwardly as the grille is inserted into the cylindrical opening but operable to bite into the surface of the cylindrical opening to prevent withdrawal in the direction opposite to insertion.

Other objects and features of the invention will become apparent as the description proceeds, especially when taken in conjunction with the accompanying drawings, illustrating a preferred embodiment of the invention, wherein.

The present invention relates to an air conditioning or mechanical cooling system for an automotive vehicle such as an automobile. Systems of this type include mechanical cooling or refrigerating systems, details of which form no part of the present invention except that the systems include an evaporator 10 through which air is circulated to cool it.

Figure 1:
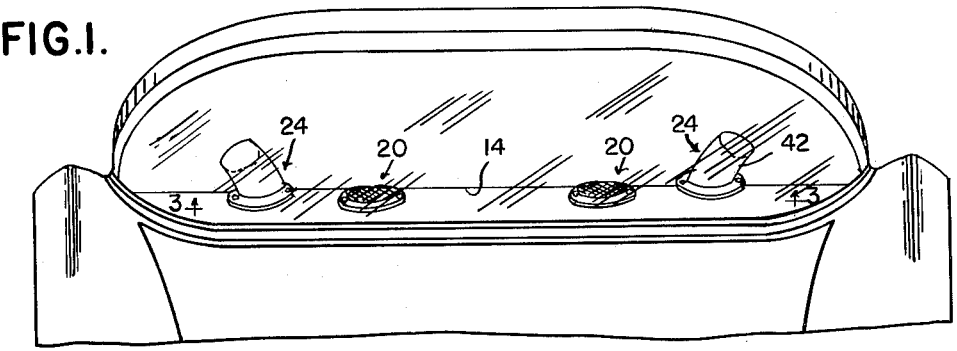
FIGURE 1 is a fragmentary perspective view seen through the rear window of an automotive vehicle of the inlet and outlet to the air conditioning or cooling duct work.
Figure 3:
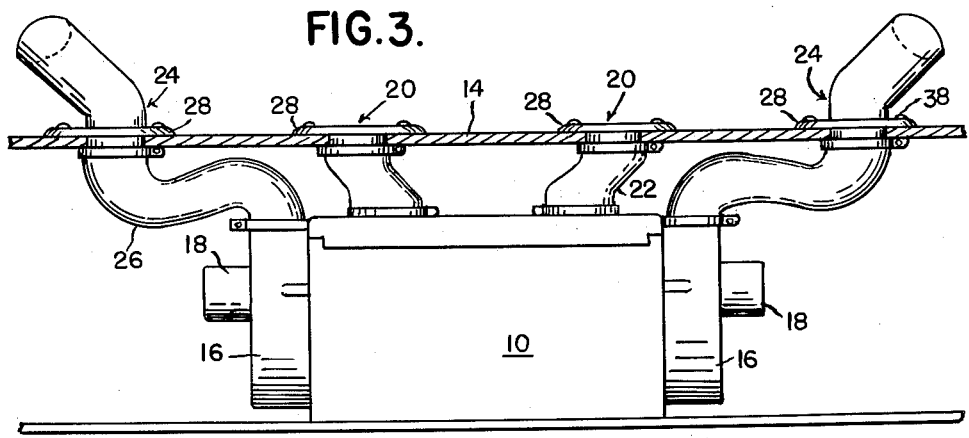
FIGURE 3 is a vertical section substantially on the line 3—3, FIGURE 1, intersecting the inlet and outlet ducts.
Figure 2:
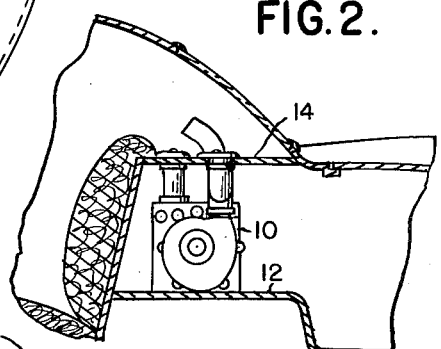
FIGURE 2 is a fragmentary sectional view taken longitudinally of the vehicle showing the arrangement of the inlet and outlet to the cooling air duct and its relationship to the evaporator of the air conditioning system.

As best seen in FIGURES 1–3 the evaporator 10 may conveniently be mounted on a support 12 located at the forward end of the rear deck of the vehicle in a position directly beneath the package tray or shelf 14. Thus, the heat exchange unit of the cooling system provides a minimum of interference with the storage space of the vehicle. The evaporator 10 has heat exchange elements therein and air is circulated through the evaporator by blowers indicated at 16 which are herein illustrated as two in number each associated with an electric motor 18.

Figure 7:
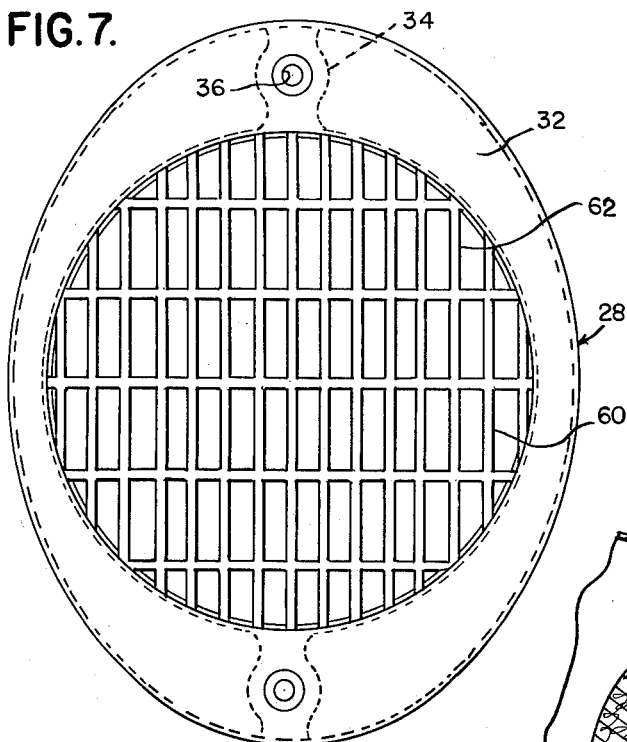
FIGURE 7 is an enlarged plan view of a mounting flange with a grille associated therewith.

Means are provided for causing a circulation of air from within the enclosure of the vehicle through the evaporator and back to the enclosure of the vehicle. This means includes intakes indicated generally at 20 through which air is drawn through flexible tubing 22 to the evaporator 10 and outlets indicated generally at 24 through which cooled air is discharged from the evaporator 10 by the blowers 16, flexible tubing 26 being provided to connect the blowers to the cooled air outlets. Each of the air inlets and outlets includes mounting flanges 28 which are identical. The details of the mounting flanges 28 are best seen in FIGURES 4–9. The flanges 28 each includes short generally tubular portions 30 to the lower end of which the flexible tubing 26 is clamped by clamp means indicated at 23 in FIGURE 4. At the upper end of the tubular portion 30 of the flanges there is provided a radially outwardly extending generally flat portion 32 which as best seen in FIGURE 7, is of oval configuration, and provided adjacent the ends thereof with thickened portions 34 apertured as indicated at 36 for the reception of mounting screws 38. The peripheral edge of the generally flat radially extending portion 32 is turned down as indicated at 40 to form a locating abutment engageable with the upper surface of the package shelf or tray 14.

The inner surface of the tubular portion 30 of the mounting flange member 28 is modified for cooperation with an adjustable air duct 42 including an inclined nozzle 43. This nozzle is preferably formed of a transparent substantially hard but somewhat flexible plastic material such for example as acrylonitrile including a short generally cylindrical portion 44 dimensioned to be received within the cylindrical portion 30 of the flange 28. The upper nozzle portion of the air duct is inclined at a substantial angle and flattened to provide a nozzle adapted to direct air outwardly at a small angle above the horizontal and in any direction desired, dependent upon the adjustment of the air duct 42.

Figure 5:
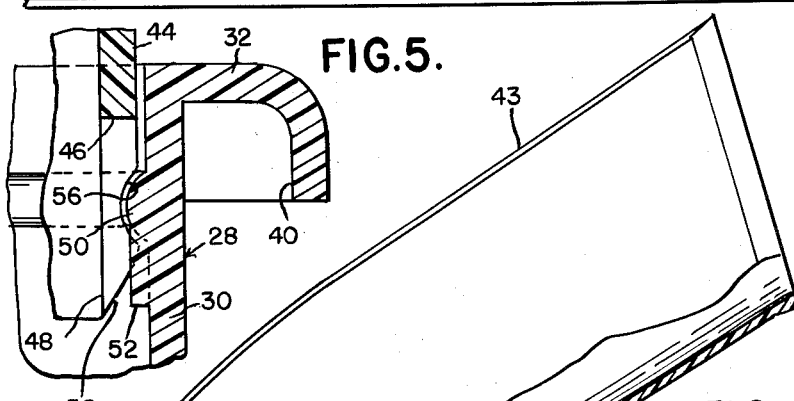
FIGURE 5 is an enlarged fragmentary view of an interengaging portion of the flange and nozzle.
Figure 4:
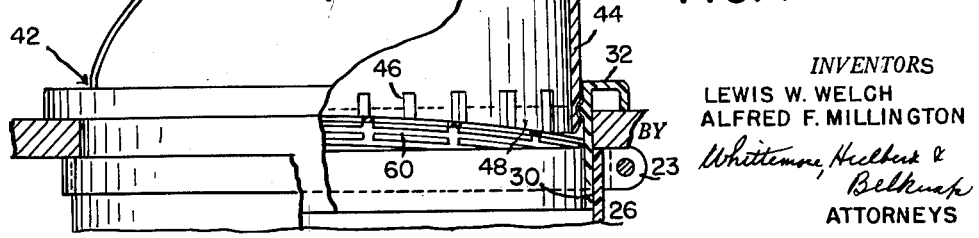
FIGURE 4 is an enlarged elevational view of a mounting flange and air directing nozzle with parts broken away.
Figure 6:
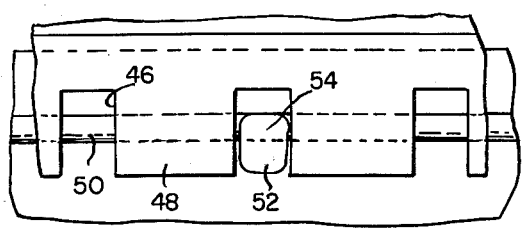
FIGURE 6 is an enlarged fragmentary elevational view showing the relationship between the mounting flange and air nozzle.

To provide for interconnection between the mounting flange and air duct the lower edge of the cylindrical portion 44 of the air duct, as best illustrated in FIGURES 4, 5 and 6, is provided with a plurality of slots 46 separated circumferentially of the edge of the cylindrical portion of the air duct to leave mounting fingers 48 therebetween. The slots 46 extend a substantial distance upwardly above the lower free edge of the air duct and accordingly, the fingers 48 will have some transverse flexibility.

Spaced downwardly below the upper end of the cylindrical portion 30 of the mounting flange is a radially inwardly extending annular bead 50. This bead is continuous and is of the substantially semi-circular crosssection best illustrated in FIGURE 5, except for a radially inwardly extending lug 52. As best seen in FIGURES 5 and 6, the lug 52 includes a portion which extends downwardly below the bead 50. However, as seen in FIGURE 6, it also includes a portion 54 which overlies the inner surface of the bead 50 and extends radially inwardly therebeyond. The circumferential extent of the lug is such that it may be received completely in a slot 46 between adjacent fingers 48.

For cooperation with the bead 50 and the lug 52 the fingers 48 provided at the lower edge of the cylindrical portion of the air duct or nozzle 42 are provided with circumferentially aligned recesses or channels 56 which are adapted to receive the bead 50. The channels 56 extend completely across each of the fingers 48 and together define a single but interrupted circular channel which receives the bead 50.

Each of the downwardly extending fingers 48 at its lower end is provided with a beveled surface 58 which operates to cam the individual fingers inwardly to the extent necessary to permit the assembly of the air duct and mounting flange. When assembled the channels 56 and bead 50 serve to retain the air duct or nozzle in assembled relation on the flange and also to guide it for angular adjustment. During angular adjustment the lug 52 engages serially with depending fingers 48 on the air duct, and is shaped with reference to the edges of said fingers so that it operates in producing a clicking sound as the air duct is adjusted. Moreover, when the lug is received in a slot 46, as indicated in FIGURE 6, it opposes angular adjustment of the air duct and hence tends to prevent accidental displacement thereof.

From the foregoing it will be observed that the air duct or nozzle 42 may be given a complete adjustment through 360 degrees. Accordingly, it is useful when the air conditioning system is not operating to direct air against the rear window of the vehicle as a defroster. This of course can be accomplished by energizing the blower motors 18 although the refrigerating system of the air conditioning is idle.

Figure 8:
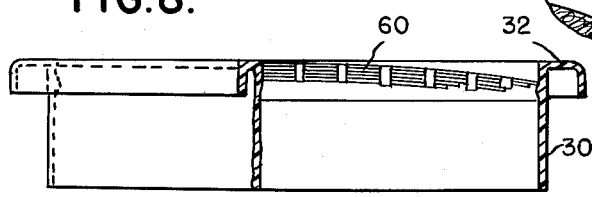
FIGURE 8 is a side elevational view of the structure of FIGURE 7 with parts broken away.
Figure 9:
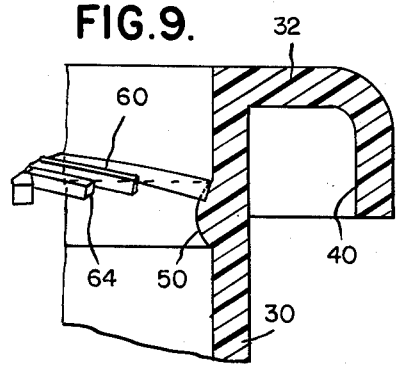
FIGURE 9 is an enlarged fragmentary view showing the support of the edge of the grille by the interior of the opening in the flange.

In order to prevent entry of foreign matter into the interior of the evaporator, protective grilles 60 are provided in all of the four mounting flanges. The grille, as best seen in FIGURES 7-9, is formed of a grille work of interconnected wires 62. The grille as a whole is dished as indicated in FIGURES 8 and 9, and the peripheral edge thereof contains the free ends 64 of the wires. These wires are cut or otherwise formed to provide the sharp corners best illustrated in FIGURE 9. Due to the dished shape of the grille it may be pressed upwardly into the cylindrical portion 30 of the flanges, pressure being applied to the concave side of the construction and thus tending to cause its edges to contract. However, pressure applied to the opposite side tending to force it in the reverse direction tends to cause its edges to expand and the sharp ends of the wires to bite into the material of the tubular portion 30 of the mounting flange. The mounting flange may be formed of the same material as the nozzle although preferably not of a clear or transparent material, and an effective interlock is thus produced as the sharp ends of the wire bite into the plastic material.

As best seen in FIGURE 9, the grille 60 is preferably moved upwardly in the tubular portion 30 of the mounting flange until the ends of its wires engage above the annular bead 50. However, the protective grille is also provided in the mounting flanges which support the air ducts or nozzles 42 and as seen in FIGURE 4, the protective grille may in this case be pressed upwardly to a position just below the lower ends of the fingers 48 where the interlock will occur to prevent downward displacement of the protective grille.

From the foregoing construction it will be observed that air flow may be controlled with considerable flexibility and cooling air directed in such a way as to produce effective overall cooling of the interior of the vehicle while at the same time avoiding drafts on the occupants. The angularly adjustable air duct or nozzle is supported for ready manual adjustment but at the same time is provided with a click mechanism which requires appreciable effort to effect angular adjustment and hence, tends to prevent accidental displacement of the ducts or nozzles.

Inasmuch as identical mounting flanges are provided for both the inlet and outlet connections to the evaporator, a substantial economy is effected.

The drawings and the foregoing specification constitute a description of the improved duct structure in such full, clear, concise and exact terms as to enable any person skilled in the art to practice the invention, the scope of which is indicated by the appended claims.

We claim:

1. In a vehicle having a rear package tray having an opening therein, a mounting flange overlying said opening and having a tubular portion extending downwardly through the opening for connection to an air conduit, said tubular portion having a radially inwardly extending annular bead therewithin, an air directing duct having an inclined nozzle portion and a tubular portion extending within the tubular portion of said mounting flange, the lower end of the tubular portion of said duct being formed to provide axially extending circumferentially spaced resilient fingers, and circumferentially aligned and extending grooves in said fingers located intermediate the ends of said fingers on their radially outer surfaces shaped to receive said bead.

2. In a vehicle having a rear package tray having an opening therein, a mounting flange overlying said opening and having a tubular portion extending downwardly through the opening for connection to an air conduit, said tubular portion having a radially inwardly extending annular bead therewithin, an air directing duct formed of a hard but resilient plastic material having an inclined nozzle portion and a tubular portion extending within the tubular portion of said mounting flange, the lower end of the tubular portion of said duct being formed to provide axially extending circumferentially spaced resilient fingers, and circumferentially aligned and extending grooves in said fingers located intermediate the ends of said fingers on their radially outer surfaces shaped to receive said bead.

3. In a vehicle having a rear package tray having an opening therein, a mounting flange overlying said opening and having a tubular portion extending downwardly through the opening for connection to an air conduit, said tubular portion having a radially inwardly extending annular bead therewithin, an air directing duct having an inclined nozzle portion and a tubular portion extending within the tubular portion of said mounting flange, the lower end of the tubular portion of said duct being formed to provide axially extending circumferentially spaced resilient fingers, circumferentially aligned and extending grooves in said fingers located intermediate the ends of said fingers on their radially outer surfaces shaped to receive said bead, a lug on the inner surface of the tubular portion of said flange dimensioned to fit in the spaces between the fingers at the end of the tubular portion of said duct operable to prevent accidental turning of said nozzle.

4. In a vehicle having a rear package tray having an opening therein, a mounting flange overlying said opening and having a tubular portion extending downwardly through the opening for connection to an air conduit, said tubular portion having a radially inwardly extending annular bead therewithin, an air directing duct having an inclined nozzle portion and a tubular portion extending within the tubular portion of said mounting flange, the lower end of the tubular portion of said duct being formed to provide axially extending circumferentially spaced resilient fingers, circumferentially aligned and extending grooves in said fingers located intermediate the ends of said fingers on their radially outer surfaces shaped to receive said bead, and a lug on the inner surface of the tubular portion of said flange dimensioned to fit in the spaces between the fingers at the end of the tubular portion of said duct operable to prevent accidental turning of said nozzle, said lug being shaped with reference to the edges of said fingers so as to provide an audible click when said nozzle is turned.

5. In a vehicle having a rear package tray having an opening therein, a mounting flange overlying said opening and having a tubular portion extending downwardly through the opening for connection to an air conduit, said tubular portion having a radially inwardly extending annular bead therewithin, an air directing duct having an inclined nozzle portion and a tubular portion extending within the tubular portion of said mounting flange, the lower end of the tubular portion of said duct being formed to provide axially extending circumferentially spaced resilient fingers, circumferentially aligned and extending grooves in said fingers located intermediate the ends of said fingers on their radially outer surfaces shaped to receive said bead, and a lug on said bead dimensioned to fit in the spaces between the fingers at the end of the tubular portion of said duct operable to prevent accidental turning of said nozzle.

6. In combination, a mounting flange having a tubular portion provided with an annular bead therein, an adjustable air duct comprising a tubular portion rotatably received within the tubular portion of said flange and having at the end thereof a plurality of circumferentially spaced fingers, aligned circumferential grooves extending across said fingers on their radially outer surfaces and receiving said bead.

7. In combination, a mounting flange having a tubular portion provided with an annular bead therein, an adjustable air duct comprising a tubular portion received within the tubular portion of said flange and having at the end thereof a plurality of circumferentially spaced fingers, aligned circumferential grooves extending across said fingers on their radially outer surfaces and receiving said bead, and a lug at the inner side of the tubular portion of said flange received in one of the spaces between a pair of adjacent fingers, said fingers being resiliently displaceable inwardly by said lug upon rotation of said nozzle.

References Cited in the file of this patent
UNITED STATES PATENTS

| | | |
|---|---|---|
| 718,599 | Bubb | Jan. 20, 1903 |
| 1,175,402 | Baylis | May 14, 1916 |
| 1,758,705 | Kean | May 13, 1930 |
| 2,170,991 | Grady | Aug. 29, 1939 |
| 2,369,303 | Kurth | Feb. 13, 1945 |
| 2,455,544 | Yonkers | Dec. 7, 1948 |
| 2,559,164 | McAllister | July 3, 1951 |
| 2,607,281 | King | Aug. 19, 1952 |
| 2,676,528 | McAlister | Apr. 27, 1954 |
| 2,714,808 | Owen | Aug. 9, 1955 |
| 2,761,291 | Golding | Sept. 4, 1956 |
| 2,798,271 | Flora | July 9, 1957 |
| 2,804,006 | Shatkin | Aug. 27, 1957 |
| 2,804,756 | Faulhaber | Sept. 3, 1957 |
| 2,807,153 | Owen | Sept. 24, 1957 |